United States Patent [19]

Nemoto

[11] 4,440,479
[45] Apr. 3, 1984

[54] REFLEX PHOTOMETRIC ASSEMBLY FOR CAMERA

[75] Inventor: Kazuyuki Nemoto, Hachioji, Japan

[73] Assignee: Olympus Optical Co. Ltd., Tokyo, Japan

[21] Appl. No.: 327,125

[22] Filed: Dec. 3, 1981

[30] Foreign Application Priority Data

Jan. 14, 1981 [JP] Japan .................................. 56-4745
Jan. 16, 1981 [JP] Japan .............................. 56-5193[U]

[51] Int. Cl.³ ............................................ G03B 7/00
[52] U.S. Cl. .................................... 354/480; 354/288
[58] Field of Search ................ 354/23 R, 59, 152, 288

[56] References Cited

U.S. PATENT DOCUMENTS

| 3,791,276 | 2/1974 | Ueda et al. ........................... 96/42 |
| 4,170,410 | 10/1979 | Sekida .............................. 354/23 R |
| 4,368,925 | 1/1983 | Nemoto ............................. 354/23 R |

FOREIGN PATENT DOCUMENTS

| 52-104925 | 9/1977 | Japan . |
| 53-18134 | 2/1978 | Japan . |
| 53-121833 | 9/1978 | Japan . |
| 55-124124 | 9/1980 | Japan ..................... 354/59 |
| 2091432 | 7/1982 | United Kingdom ............. 354/23 R |

Primary Examiner—Russell E. Adams
Attorney, Agent, or Firm—Weinstein & Sutton

[57] ABSTRACT

A reflex photometric assembly for a camera is integrally formed of a reflecting member for directing light reflected by a shutter blind and a film surface to a photoelectric transducer element for photometry and a shield member for preventing the light reflected by the shutter blind and the film surface from directly impinging upon the photoelectric transducer element so that both the reflecting member and the shield member can be accurately positioned in relation to the photoelectric transducer element without need for further adjustment.

12 Claims, 6 Drawing Figures

REFLEX PHOTOMETRIC ASSEMBLY FOR CAMERA

BACKGROUND OF THE INVENTION

The invention relates to a reflex photometric assembly for a camera, and more particularly, to a photometric assembly for use in a camera of the reflective photometric type in which light from an object being photographed which passes through a taking lens is reflected by a film surface or the surface of a shutter blind of a focal plane shutter and is guided by a reflecting member to impinge on a photoelectric transducer element which is provided for the purpose of photometry.

In a single lens reflex camera utilizing a focal plane shutter, a reflex photometric assembly has already been proposed in which a reflecting member is utilized to direct light reflected from the surface of a first shutter blind or a film surface exposed by running of the blind to a photoelectric transducer element which is disposed in the bottom of a dark box and a proper exposure is provided by controlling the amount of light received by the transducer element. In such an assembly, the transducer element for photometry and an IC package forming an exposure control circuit can be formed as one integral package which may be directly disposed on a printed circuit board. This avoids the need to route a signal current from the transducer element which has a minimal magnitude to spaced or remote points, thus eliminating the likelihood of malfunctioning in response to extraneous noises or a discontinuity in the lead wires. The incorporation of the transducer element and the IC package into an integral unit reduces the cost and the space requirement, affording the advantage of allowing effective utilization of the available space.

However, a point with this assembly is the fact that only the light which is reflected by the reflecting member must be directed to impinge on the transducer element. If the light reflected by the blind surface or the film surface directly impinges on the transducer element if the proportion is small, the distribution of light receiving sensitivity is disturbed, preventing an accurate photometry. Consequently, it is necessary to provide a shield member or members which prevent a direct impingement of the reflected light from the blind or the film surface onto the transducer element.

However, when shielding the reflected light from the film surface which directly impinges on the transducer element, the impingement of the light from the reflecting member onto the transducer element must not be intercepted or otherwise an accurate photometry is again prevented. In addition, the provision of the shield member involves the likelihood that a reduced magnitude of a photometric output may degrade the performance of an associated camera. Hence, the location of the shield member is extremely delicate which reliable prevents the direct impingement of the light reflected from the blind or the film surface without intercepting the incident light from the reflecting member. It is difficult to attain a desired effect as described above only by securing the shield member to a fixed member.

Therefore, the inventor has previously proposed a reflex photometric assembly which includes an adjustable shield member covering the light receiving surface of a photoelectric transducer element so as to prevent a direct impingement of the reflected light from the blind or the film surface without intercepting the incident light upon the photoelectric transducer element from a reflecting member (U.S. application Ser. No. 253,722).

However, the proposed photometric assembly needs the delicate adjustment for securing the shield member in a proper shielding position and hence is inadequate for introducing it into the assembling process aiming at the recent automation developments in.

SUMMARY OF THE INVENTION

It is an object of the invention to provide a reflex photometric assembly for a camera in which a shield member is incorporated into an integral unit with holding means for holding a reflecting member and a photoelectric transducer element, thereby making the adjustment for locating the shield member unnecessary.

It is another object of the invention to provide a reflex photometric assembly for a camera in which the need of the adjustment for positioning the shield member is avoided only by mounting a light receiving structure which is formed by the shield member and the reflecting member as an integral unit and a photoelectric transducer element for photometry in their predetermined positions on a mounting member.

According to the invention, the reflecting member, the shield member, and a holding section for disposing the photoelectric transducer element or a positioning section for a mounting member on which the transducer is disposed, which are in a delicate positional relationship with each other, are integrally formed into a light receiving structure to thereby make the positional adjustments among these members unnecessary, and the reflecting member, the shield member, and the transducer element can be accurately located in relation to the shutter blind and the film surface by disposing the light receiving structure or the mounting member to which the latter is fixed in a predetermined position in a camera.

Further, according to the invention, the light receiving structure may not necessarily utilize an expensive metal, for example a plastic molded structure or the like can be used which can still maintain a high accuracy, and hence can be formed at a much lower cost than that encountered in conventional photometric apparatus.

Still further, according to the invention, the need to route a signal from the transducer element can be avoided by using a printed circuit board as a mounting member, thus permitting an accurate photometry.

DETAILED DESCRIPTION OF PREFERRED EMBODIMENTS

Figure 1:
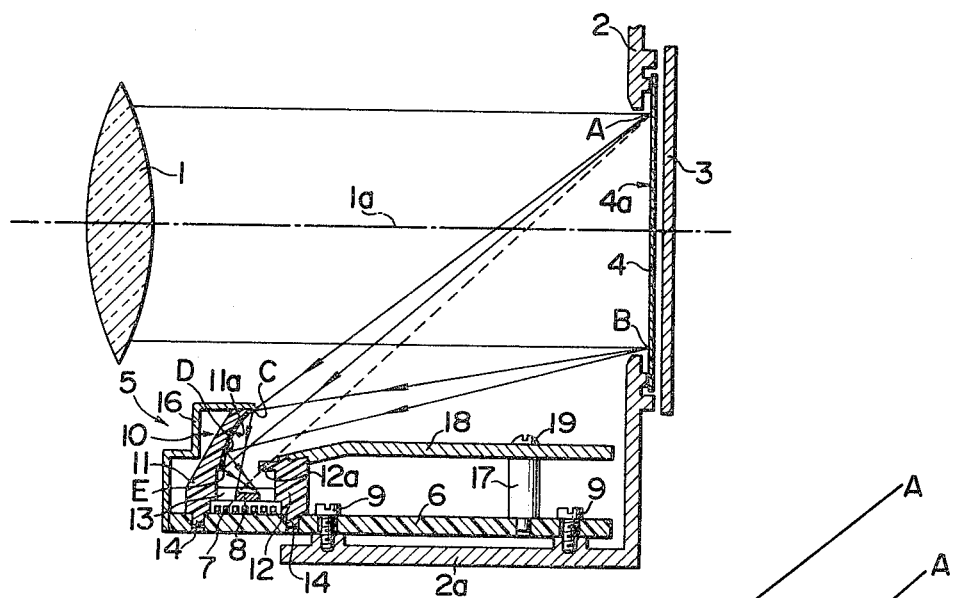
FIG. 1 is a cross section of a reflex photometric assembly for a camera according to one embodiment of the invention.

Referring to FIG. 1, a reflex photometric assembly according to an embodiment of the invention is shown in cross section. An optical image which is reflected from an object being photographed impinges on a camera through a taking lens 1. A photographic film 4 is held between a camera body 2 and a film pressure plate 3 and has an image field 4a which is hereafter referred to as a film surface. The optical image is projected onto a reflecting surface of a first blind, not shown, of a shutter and the image field or film surface 4a which is centered about the axis 1a of the lens 1. A reflex photometric assembly 5 is located below the taking path so as to avoid an interference therewith and is mainly constructed by an IC package 7 disposed on a printed circuit board 6 and a light receiving structure 10 fixed to the board 6 holding the IC package 7. Specifically, the printed circuit board 6 as a mounting member is disposed in parallel relationship to the optical axis 1a and is fixed to a lower plate 2a of the camera body 2 with screws 9. The light receiving structure 10 which holds IC package 7 is disposed on the lateral end of the circuit board 6 which is located nearer the taking lens 1. The transducer element 8 is disposed in an integral manner with the IC package 7 on its upper surface. A lead pin array 7a (see FIGS. 2 and 3) of the IC package 7 is soldered to an associated conductor pattern on the board 6.

Figure 2:
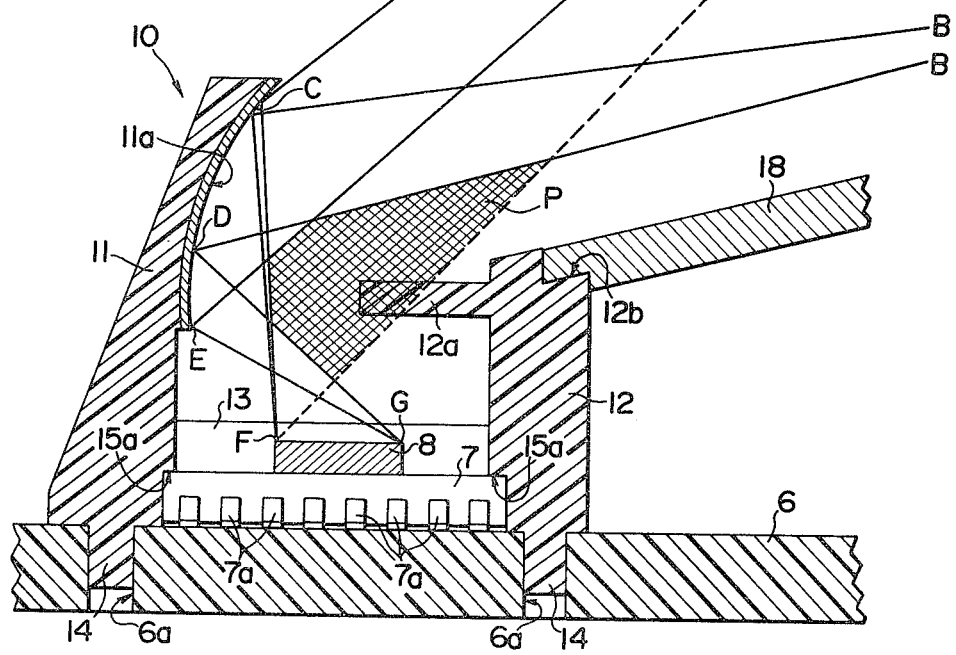
FIG. 2 is an enlarged cross section of part of the reflex photometric assembly shown in FIG. 1.
Figure 3:
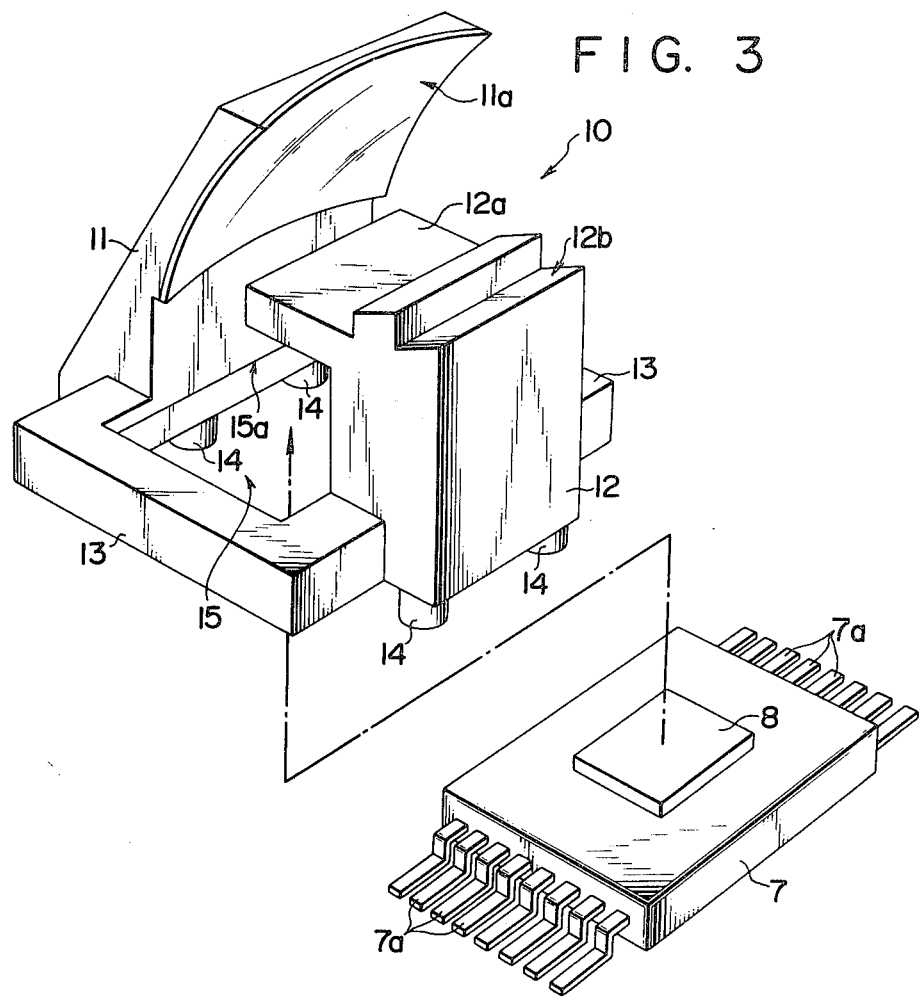
FIG. 3 is a perspective view of a status prior to assembling a light receiving structure and a photoelectric transducer element for photometry in the reflex photometric assembly shown in FIG. 1.

The light receiving structure 10, as shown in FIGS. 2 and 3 in enlarged cross section, assumes a framework configuration, e.g., comprises an integrally molded structure formed with a plastic material. Specifically, the structure 10 is integrally formed of a reflecting member 11 an upper part of which rises with a slight inward gradient, a shield member 12 facing the reflecting member 11, and a connecting member 13 connecting lower parts of both the members 11 and 12. In the upper half of the reflecting member 11 and on the inside thereof facing the shield member 12 is formed a reflecting surface 11a which faces a film surface 4a and the light receiving surface of transducer element 8. The reflecting surface 11a is formed as a partial spherical surface of a curvature which receives the reflected light from the entire film surface 4a and directs its entirety toward the light receiving surface of the transducer element 8, and subsequently is applied a mirror surface treatment such as aluminum plating, silver plating, or the like. In the upper part of the shield member 12 and on the inner side thereof facing the reflecting member 11 is formed a shield section 12a which protrudes towards reflector 11a by a predetermined length as will be described later. On the opposite side of the shield section 12a is formed a step 12b for mounting a bottom shielding member 18 to be described later. At the bottom of the reflecting member 11 and at the bottom of the shield member 12 are formed a plurality of positioning projections 14. In addition, at the bottom of the light receiving structure 10 is formed an opening 15 enclosed by the reflecting member 11, the shield member 12 and the connecting member 13 for inserting the IC package 7. On the periphery of the opening 15 is formed a positioning step 15a which retains the IC package 7 in a predetermined position. Specifically, the opening 15 having the step 15a forms a holding section for positioning and holding the IC package 7 and the transducer element 8 which is integral with the IC package 7 in place. The mounting of the light receiving structure 10 on the circuit board 6, as shown in FIG. 3, is effected first by inserting the IC package 7 into the opening 15 from its bottom and by positioning it in place by the step 15a. Since the opening 15 and the step 15a are previously formed according to the shape and size of the IC package 7 so as not to be shaky with play therebetween after the IC package 7 is mounted, the transducer element 8 on the IC package 7 is disposed accurately in a predetermined position in relation to the reflecting surface 11a of reflecting member 11 and the shielding section 12a of shield member 12. The light receiving structure 10 which holds the IC package integrally is fixed on the circuit board 6 by engaging each positioning projection 14 of the structure 10 with an associated fixing hole 6a which is provided in a predetermined position on the board 6. Thereby, the structure 10 and the transducer element 8 are integrally disposed in their predetermined positions on the board 6, namely, in the positions assuming a predetermined light receiving angle in relation to the film surface 4a. After the IC package 7 is disposed in place on the board 6 by the structure 10, its lead pin array 7a is soldered to a conductive pattern on the board 6. It is to be noted that means for positioning the light receiving section relative to the circuit board 6 may not be limited to the method employing the engagement between the positioning projections 14 of the structure 10 and the fixing holes 6a of the board 6 as shown in the embodiment depicted in FIGS. 1-3. By way of example, instead of positioning and fixing the structure 10 with the projections 14 and the holes 6a, the IC package 7 may be positioned and fixed to board 6 by employing a jig or the like. In this case, the structure 10 is mounted on the board 6 in such a manner that the package 7 fixed to the board 6 is inserted into the opening 15 of the structure 10, resulting in the structure 10 being positioned in place by the package 7. Thereafter, the structure 10 and the board 6 may be fixed by adhesion, or the like.

The reflecting member 11 of the structure 10 which is positioned and fixed on the circuit board 6 is provided with a light shielding cover 16 covering the back of the reflecting surface 11a (see FIG. 1). In addition, a support member 17 in the form of a post is fixed on the end of the circuit board 6 located toward the film surface by engaging a lower end projection of the support member 17 with a hole provided on the board 6. A bottom shield member 18 in the form of a sheet is mounted upon support member 17 with a screw 19. The bottom shield member 18 generally extends in parallel relationship with the optical axis 1a of the taking lens 1, left end of which is mounted on a step 12b of the shield member 12 of the structure 10. The bottom shield member 18 and the light shielding cover 16 prevent light from entering an area outside of the light receiving section between the reflecting member 11 and the shield member 12 and also prevent light other than the reflected light by the film surface 4a from entering the light receiving section.

The shield section 12a of the shield member 12 has a sufficient length so that its tip reaches a position over the light receiving surface of the transducer element 8 within scope to be described later, to prevent the reflected light by the film surface 4a from entering transducer element 8 directly. The preventive action by the shield section 12a against the direct impingement of the light reflected by the film surface 4a is as follows.

As shown in FIG. 1, when an optical image of an object being photographed which passes through the taking lens 1 is projected onto the film surface 4a, the light which is reflected by the film surface 4a at an uppermost point A thereon is reflected by the reflecting surface 11a of the reflecting member 11 at an uppermost and a lowermost point C, E thereof, and then impinges on the light receiving surface of the transducer element 8 at points F, G which are located at left end and the right end thereof (see FIG. 2). The light reflected from the film surface at the point A and impinging on the reflecting member 11 intermediate the points C and E will obviously be incident on the entire light receiving surface of the transducer element 8 which is located between the points F and G. Similarly, the light which is reflected by the film surface 4a at the lowermost point B thereon is reflected by the reflecting surface 11a of the reflecting member 11 at the uppermost and a lower point C, D thereof and is then incident on the light receiving surface of the transducer element 8 at points F and G, respectively. Again, the reflected light from the film surface 4a which is reflected at the point B and incident on the reflecting member 11 at locations intermediate the points C and D will obviously be incident on the entire light receiving surface of the transducer element 8 which is located between the points F and G.

Since an interference of the shield section 12a of the shield member 12 with the path of the reflected light from the film surface 4a which impinges on the transducer element 8 after reflection by the reflecting surface 11a must be avoided, it is seen that the shield section 12a must be located in a region which is disposed to the right of the light paths ACF, AEG, BCF and BDG. Simultaneously, the direct impingement of the reflected light from the film surface 4a onto the transducer element 8 without experiencing a reflection by the reflecting surface 11a must be prevented. Accordingly, the shield section 12a must be positively disposed to the left of a boundary line AF which joins the point A on the film surface 4a and the point F on the light receiving surface of the transducer element 8.

From the foregoing description, it will be seen that the shield section 12a must be disposed in a region P shown in FIG. 2. As long as the shield section 12a is disposed within the region P, it is assured that the shield section 12a does not interfere with the incidence of the reflected light from the film surface 4a onto the transducer element 8 after its reflection by the reflecting surface 11a while reliably intercepting the direct impingement of the reflected light from the film surface 4a onto the transducer element 8.

The length of the shield section 12a is previously accurately defined so that it can be reliably disposed within the allowable region P. Specifically, in order to dispose the shield section 12a accurately within the region P, it is necessary to take the mutual relations among the shield section 12a, reflecting surface 11a, and transducer element 8 (IC package 7) and further the positional relations among these members and film surface 4a into consideration. To this end, since the mutual positional relations among the shield section 12a, reflecting surface 11a, and transducer element 8 are definitely determined by the integral formation of the structure 10, the position of the shield section 12a on the structure 10 should be accurately sized so that it comes into the region P in the predetermined position on the board 6. Consequently, when assembling the shield section 12a can be disposed within the region P only by fixing the structure 10 to the board 6 in its predetermined position and engaging the projection 14 with the hole 6a. Therefore, the adjustment during assembling is unnecessary, and after being assembled only the reflected light directly impinging upon the transducer element 8 from the film surface 4a is reliably prevented, thus an accurate photometry is obtained.

It will be understood that while the above-mentioned embodiment employs the transducer element 8 integral with the IC package 7, an individual photoelectric transducer element may be employed by holding it directly in a predetermined position on the structure 10.

Figure 4:
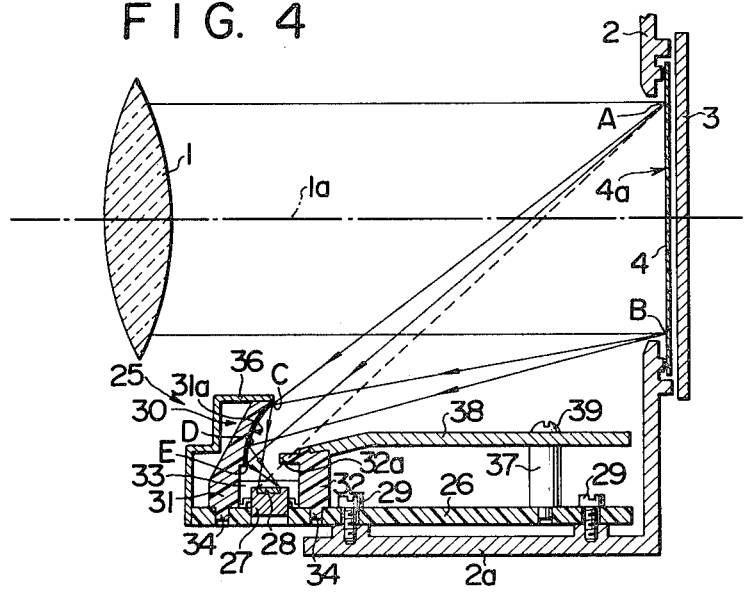
FIG. 4 is a cross section of a reflex photometric assembly for a camera according to another embodiment of the invention.

Referring to FIG. 4, a reflex photometric assembly 25 according to another embodiment of the invention is shown in a cross section. The reflex photometric assembly 25 is located below a taking path of light which impinges upon a reflecting surface of a first blind and a first surface 4a from an object being photographed through a taking lens 1 when a shutter is released so as to avoid an interference with the taking path. The photometric assembly 25 generally comprises an IC package 27 disposed on a printed circuit board 26 and a light receiving structure 30 fixed to the circuit board 26. Specifically, the printed circuit board 26 as a mounting member is mounted on a lower plate 2a of a camera body 2 in parallel relationship with the optical axis 1a with screws 29. The IC package 27 and the light receiving structure 30 are mounted on the end of the circuit board 26 located toward the taking lens 1. The IC package 27 includes a photoelectric transducer element 28 integral therewith on its upper surface. Dual lead pin arrays 27a, 27a of the IC package 27 (see FIGS. 5 and 6) are soldered to a conductive pattern on the board 26.

Figure 5:
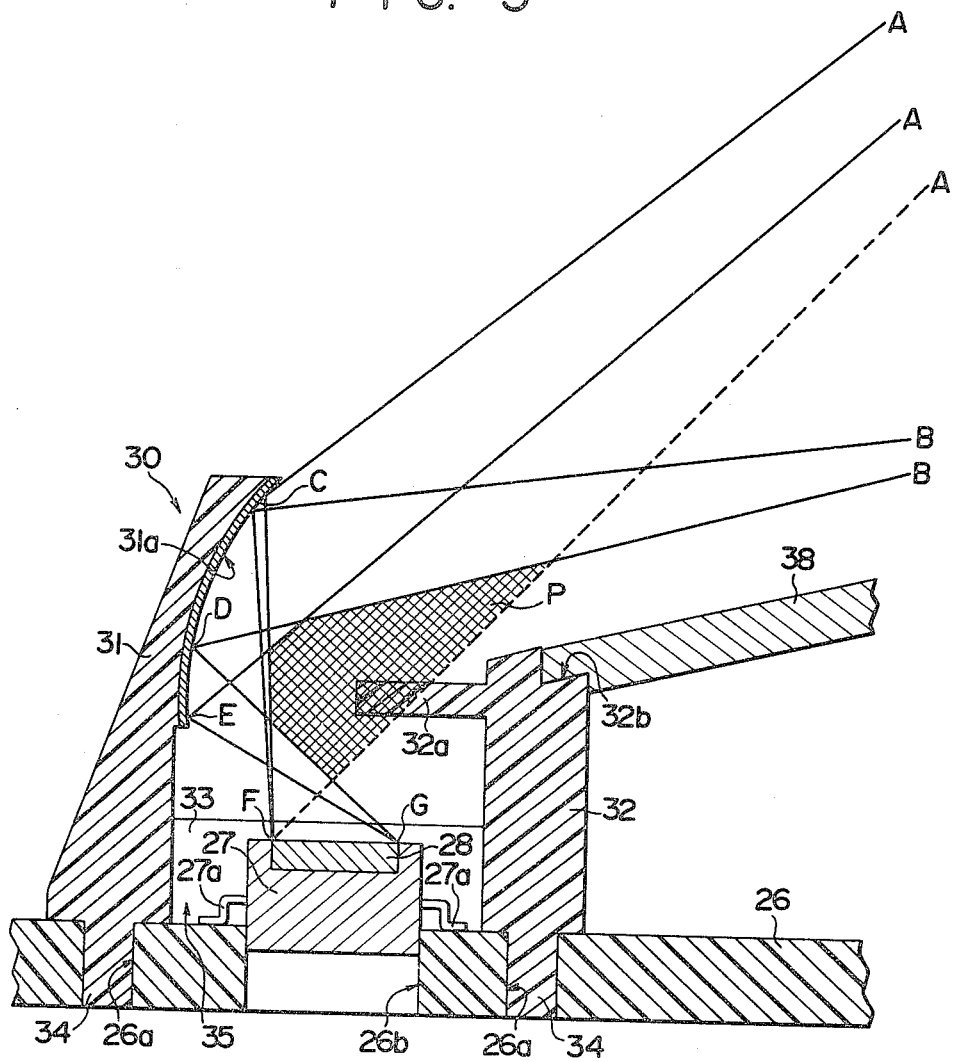
FIG. 5 is an enlarged cross section of part of the reflex photometric assembly shown in FIG. 4.
Figure 6:
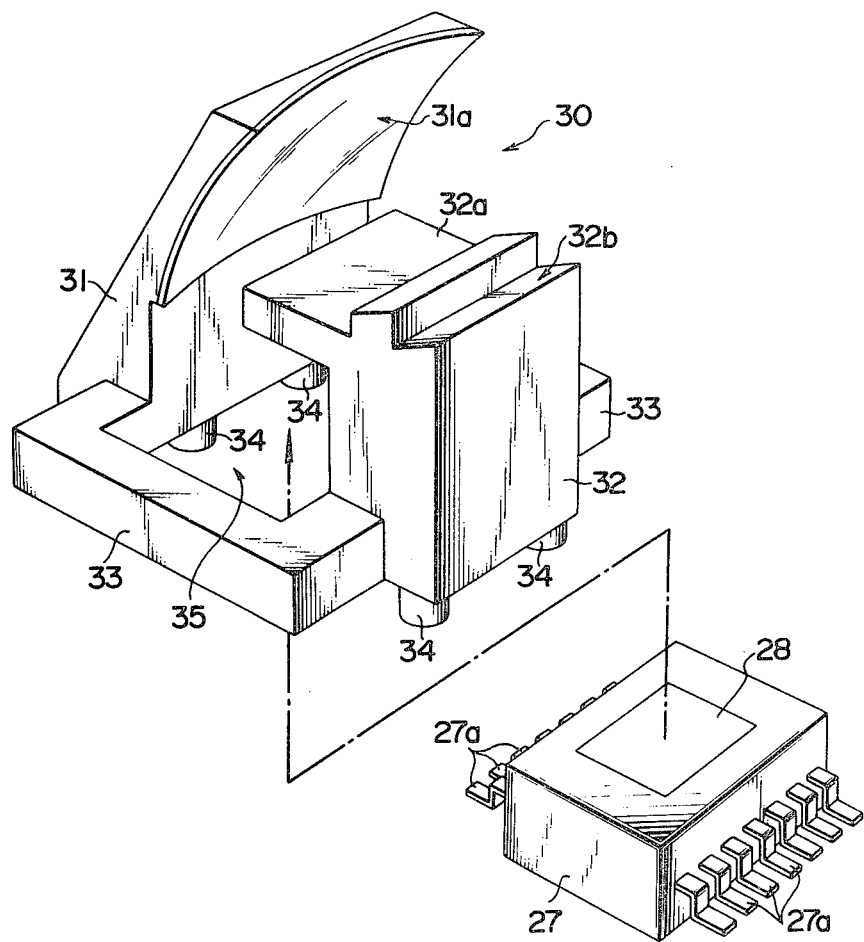
FIG. 6 is a cross section of a status prior to assembling a light receiving structure and a photoelectric transducer element for photometry in the reflex photometric assembly shown in FIG. 4.

The light receiving structure 30, as shown in FIGS. 5 and 6 in enlarged cross section, assumes a framework configuration such as an integrally molded structure formed with a plastic material. Specifically, the structure 30 is integrally formed of a reflecting member 31 an upper part of which rises with a slight inward gradient, a shield member 32 facing the reflecting member 31, and a connecting member 33 connecting both lower parts of the members 31 and 32. In the upper half of the reflecting member 31 and on the inside thereof facing the shield member 32 is formed a reflecting surface 31a which faces the film surface 4a (see FIG. 4) and the light receiving surface of transducer element 28. The reflecting surface 31a is formed as a partial spherical surface of a curvature which receives the reflected light from the entire film surface 4a and directs its entirety toward the light receiving surface of the transducer element 28, and subsequently is applied a mirror surface treatment such as aluminum plating, silver plating, or the like. In the upper part of the shield member 32 and on the inner side facing the reflecting member 31 is formed a shield section 32a which protrudes by a predetermined length as will be described later toward the reflecting surface 31a. On the opposite side of the shield section 32a is formed a step 32b for mounting a bottom shielding member 38 to be described later. At the bottoms of each of the reflecting member 31 and the shield member 32 is formed a positioning projection 34. In addition, at the bottom of the light receiving structure 30 is formed an opening 35 enclosed by the reflecting member 31, shield member 32, and connecting member 33. The opening 35 is for receiving and mounting the IC package 27 therewith on the circuit board 26.

On the other hand, at a predetermined position of the circuit board 26 on its end which is located nearer the taking lens 1 are formed fixing holes 26a for positioning and fixing the structure 30 by fitting a positioning projections 34 thereof and a fixing hole 26b for positioning and fixing the IC package 27 which is integral with the transducer element 28. The circuit board 26 is accurately positioned on the lower plate 2a in relation to the camera body 2 to be secured thereto with screws 29.

When the reflex photometric assembly 25 is assembled, first the IC package 27 is inserted into the hole 26b of the circuit board 26 to be positioned in place, the dual lead pin arrays 27a, 27a of the package 27 are soldered to a conductive pattern on the board 26, and subsequently the light receiving structure 30 is positioned and fixed by inserting the projection 34 of the structure 30 into the hole 26a of the board 26. Consequently, the IC package 27 fixed to the circuit board 26 is positioned within the opening 36 of the structure 30 as shown in FIG. 5. Thus, since the IC package 27 fixed to the board 26 and the structure 30 have their positions defined in relation to the board 26, respectively, the transducer element 28 on the IC package 27 is positioned in a predetermined position relative to the reflecting surface 31a of the reflecting member 31 and the shield section 32a of the shield member 32. Finally, the circuit board 26 on which the IC package 27 and the structure 30 have been mounted is fixed to the lower plate 2a of the camera body 2 with screws 29. Then, the light receiving section comprising the transducer element 28 on the IC package 27 and the structure 30 is integrally disposed in a predetermined position in relation to the camera body 2, namely, at a position assuming a predetermined light receiving angle in relation to the film surface 4a.

Furthermore, the reflecting member 31 of the light receiving structure 30 which is fixed on the circuit board 26 is provided with a light shielding cover 36 (see FIG. 4). Also, a support member 37 in the form of a post is fixed on the end of the board 26 located toward the film surface by engaging a lower end projection of the support member 37 with a fixing hole provided on the board 26. On the support a bottom shield member 38 in the form of a sheet is mounted upon support member 37 with a screw 39. The bottom shield member 38 generally extends in parallel relationship with the optical axis 1a of the taking lens 1, the left end of which is mounted on a step 32b of the shield member 32 of the structure 30. The bottom shield member 38 and the light shielding cover 36 prevent light from entering a portion outside of the light receiving section between the reflecting member 31 and the shield member 32 and also prevent light other than the reflected light by the film surface 4a from entering the light receiving section.

In the light receiving structure 30, the shield section 32a of the shield member 32 has a sufficient length so that its tip reaches a location over the light receiving surface of the transducer element 28, to prevent the reflected light by the film surface 4a from impinging directly upon the transducer element 28. The preventive action by the shield section 32a against the direct impingement of the reflected light from the film surface 4a is the same as the above-mentioned embodiment (FIGS. 1, 2 and 3). The length of the shield section 32a is previously accurately defined so that it can be reliably disposed within the allowable region P. Specifically, in order to dispose the shield section 32a accurately within the region P, it is necessary to take the mutual relations among the shield section 32a, reflecting surface 31a, and transducer element 28 (IC package 27) and further the positional relations among these members and film surface 4a into consideration. To this end, since the mutual positional relation between the shield section 32a and the reflecting surface 31a is definitely determined by forming the structure 30 integrally and also the positional relations of the transducer element 28 to the shield section 32a and the reflecting surface 31a are accurately determined by fixing the structure 30 and the transducer element 28 after definitely being positioned in relation to the circuit board 26, the position of the shield section 32a on the structure 30 should be accurately previously sized so that it comes into the region P at the predetermined position on the board 26. Consequently, assembly of the shield section 32a can be automatically obtained within the region P merely by fixing the circuit board 26 to the lower plate 2a of the camera body 2 after fixing the structure 30 and the IC package 27 to the board 26 in the predetermined position. Therefore, further adjustment during assembling is unnecessary, and after assembly only the reflected light directly impinging upon the transducer element 28 from the film surface 4a is reliably prevented, thus an accurate photometry obtained.

It will be understood that while the above-mentioned embodiment (FIGS. 4-6) employs the transducer element 28 integral with the IC package 27, an individual photoelectric transducer element may be employed.

Further, it is to be noted that the light receiving structure 30 and the photoelectric transducer element 28 may be fixed to a conventional mounting member without employing the printed circuit board 26.

What is claimed is:

1. A reflex photometric assembly for a camera determining its proper exposure by receiving light which passes through a taking lens and is reflected by a shutter blind and a film surface towards a photometric transducer element for photometry, the assembly comprising:

a mounting member which is secured to the body of the camera;

means supporting said photoelectric transducer element being secured upon said mounting member;

a one-piece light receiving structure integrally formed of a reflecting member having a reflecting surface to direct the light reflected by the shutter blind and the film surface toward the photoelectric transducer element and a shield member having shield means to prevent light reflected by either the shutter blind or the film surface from directly impinging upon the element and connecting members extending between said reflecting member and said shield member, said connecting members, said reflecting member and said shield member cooperatively defining an opening in which the transducer element is positioned; and said mounting member including means for positioning and fixing the light receiving structure for simply and yet accurately positioning said transducer element relative to said reflecting surface and said shield member.

2. A reflex photometric assembly according to claim 1 in which the opening in said light receiving structure is shaped to position and hold the transducer element in a predetermined position.

3. A reflex photometry assembly according to claim 2 in which the light receiving structure is formed with positioning means for defining its mounting position in relation to the mounting member and the mounting member is formed with means for receiving said positioning means for accurately mounting the light receiving structure thereon.

4. A reflex photometric assembly according to claim 3 in which the light receiving structure is integrally formed as a unitary plastic member.

5. A reflex photometric assembly according to claim 1 in which the light receiving structure is formed with positioning means for defining its mounting position in relation to the mounting member, and the mounting member is formed with fixing means for mounting the light receiving structure and the transducer element at their respective predetermined positions.

6. A reflex photometric assembly according to claim 5 in which the light receiving structure is integrally formed as a unitary plastic member.

7. A reflex photometric assembly according to claim 1 in which the mounting member comprises a printed circuit board.

8. The reflex photometric assembly of claim 1, wherein said supporting means comprises an integrated circuit (IC) package, said transducer element being mounted directly upon said package and being electrically connected thereto.

9. The reflex photometric assembly of claim 8, wherein said mounting member comprises a printed circuit board having a conductor pattern, said package including electrical leads connected to said conductor pattern.

10. A photometric assembly for a camera comprising:
   a unitary member comprised of a reflective portion having a reflective surface for directing light reflected from either a shutter blind or a film surface toward a photoelectric transducer;
   a shielding portion for preventing light reflected from either the shutter blind or the film surface from directly impinging upon said transducer; and
   joining portions integrally joined to said reflective portion and said shield portion for accurately locating said reflective shielding portions relative to one another;
   said shielding, reflective and joining portions defining an open region for receiving said transducer;
   a mounting member having a mounting surface; and
   said mounting member having first and second positioning portions to accurately position said unitary member and said transducer upon said mounting surface, thereby accurately positioning said transducer relative to the reflective surface and said shielding portion.

11. The assembly of claim 10 wherein said mounting surface is provided with a positioning opening for receiving and accurately positioning said transducer within said open region.

12. The assembly of claim 10 wherein said unitary member is provided with positioning means for accurately holding and positioning said transducer in said open region.

* * * * *

UNITED STATES PATENT AND TRADEMARK OFFICE
CERTIFICATE OF CORRECTION

PATENT NO. : 4,440,479
DATED : April 3, 1984
INVENTOR(S) : Kazuyuki Nemoto

It is certified that error appears in the above-identified patent and that said Letters Patent is hereby corrected as shown below:

Column 1:

Line 57, change "reliable" to --reliably--.

Column 2:

Line 7, delete the word "automation" and after the word "in" insert the word --automation--.

Column 4:

Line 51, after "1," insert the word --the--.

Column 7:

Line 1, change "jections" to --jection--.

Signed and Sealed this

Thirtieth Day of October 1984

[SEAL]

Attest:

*Attesting Officer*

GERALD J. MOSSINGHOFF

*Commissioner of Patents and Trademarks*